(12) United States Patent
Camenisch et al.

(10) Patent No.: US 10,171,439 B2
(45) Date of Patent: Jan. 1, 2019

(54) OWNER BASED DEVICE AUTHENTICATION AND AUTHORIZATION FOR NETWORK ACCESS

(71) Applicant: International Business Machines Corporation, Armonk, NY (US)

(72) Inventors: Jan L. Camenisch, Thalwil (CH); Gero Dittmann, Zürich (CH); Andreas X. Meier, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 14/863,799

(22) Filed: Sep. 24, 2015

(65) Prior Publication Data
US 2017/0093821 A1    Mar. 30, 2017

(51) Int. Cl.
*H04L 29/06* (2006.01)

(52) U.S. Cl.
CPC ........ *H04L 63/061* (2013.01); *H04L 63/0876* (2013.01)

(58) Field of Classification Search
CPC ... H04L 63/08; H04L 2209/60; H04L 63/083; H04L 63/0876; H04L 63/061;
(Continued)

(56) References Cited

U.S. PATENT DOCUMENTS 7,350,076 B1*  3/2008  Young ............... H04L 63/062
                                                709/225
7,551,574 B1*  6/2009  Peden, II .......... H04L 63/102
                                                370/310

(Continued)

OTHER PUBLICATIONS

Campbell, T.R. Self-authorization: a methodology for secured network access in a distributed paradigm. Published in: SoutheastCon, 2005. Proceedings. IEEE. Apr. 8-10, 2005. pp. 372-377, Abstract Only pp. 1-2, downloaded from http://ieeexplore.ieee.org/xpl/abstractAuthors.jsp?arnumber=1423275&queryText=authorize+enterprise+network+access+to+devices&newsearch=true&searchField=Search_All Sep. 24, 2015.

(Continued)

*Primary Examiner* — Catherine B Thiaw
(74) *Attorney, Agent, or Firm* — Thomas A. Beck; Daniel P. Morris

(57) ABSTRACT

Methods and computerized units grant network access to any one of multiple devices of the same owner. Each of the multiple devices has been previously associated with an owner at an authentication server, whereby device keys for authenticating said multiple devices are stored on the authentication server. Also, said owner has previously been authorized to access the network, such that an owner ID for this owner is stored on the authentication server. In embodiments, present methods comprise, at the authentication server: receiving a network access request for a device to connect to a network, said device being one of the multiple devices; and upon authenticating said device based on a device key associated with this device at the authentication server, confirming that network access can be granted for the device if said owner ID is confirmed to be associated with said device at the authentication server.

12 Claims, 3 Drawing Sheets

(58) Field of Classification Search
CPC ..... H04L 63/082; H04L 9/321; H04L 63/102; H04L 63/0823; H04L 63/10
See application file for complete search history.

(56) References Cited

U.S. PATENT DOCUMENTS

| | | | |
|---|---|---|---|
| 8,800,003 B2 | 8/2014 | Guo | |
| 9,009,805 B1* | 4/2015 | Kirkby | G06K 9/00711 709/203 |
| 9,319,419 B2* | 4/2016 | Sprague | H04L 63/126 |
| 2005/0044377 A1 | 2/2005 | Huang | |
| 2005/0239447 A1* | 10/2005 | Holzman | H04L 63/08 455/414.3 |
| 2008/0108322 A1 | 5/2008 | Upp | |
| 2009/0286509 A1* | 11/2009 | Huber | G06Q 20/1235 455/410 |
| 2009/0300744 A1* | 12/2009 | Guo | H04L 63/0823 726/7 |
| 2010/0235638 A1 | 9/2010 | Irvine | |
| 2013/0058274 A1* | 3/2013 | Scherzer | H04L 63/107 370/328 |
| 2013/0291072 A1* | 10/2013 | Den Hartog | H04L 63/102 726/4 |
| 2013/0333016 A1* | 12/2013 | Coughlin | H04W 12/06 726/9 |
| 2014/0123232 A1* | 5/2014 | Kuscher | H04L 63/0876 726/4 |
| 2014/0237250 A1 | 8/2014 | Menezes | |
| 2014/0282991 A1* | 9/2014 | Watanabe | G06F 21/34 726/9 |
| 2014/0304788 A1 | 10/2014 | Sposato | |
| 2014/0359741 A1* | 12/2014 | Kistner | H04L 63/0823 726/7 |
| 2015/0186875 A1* | 7/2015 | Zhang | G06Q 20/382 705/44 |
| 2015/0237049 A1* | 8/2015 | Grajek | H04L 63/0815 726/7 |
| 2015/0295930 A1* | 10/2015 | Dixon | H04L 63/083 713/181 |
| 2015/0304110 A1* | 10/2015 | Oberheide | H04L 63/12 713/155 |
| 2015/0319167 A1* | 11/2015 | Brand | H04L 63/0853 713/156 |
| 2016/0050200 A1* | 2/2016 | Yu | H04L 63/0823 726/10 |
| 2016/0088026 A1* | 3/2016 | Mohamad Abdul | G06F 8/60 726/1 |
| 2016/0105420 A1* | 4/2016 | Engan | H04L 9/3228 455/411 |
| 2016/0365984 A1* | 12/2016 | Lee | H04L 9/3247 |
| 2017/0034168 A1* | 2/2017 | Wilson | H04L 63/0884 |
| 2017/0041150 A1* | 2/2017 | Ishiguro | H04L 9/3263 |

OTHER PUBLICATIONS

Wong, K.H.M et al, A dynamic user authentication scheme for wireless sensor networks. Published in: Sensor Networks, Ubiquitous and Trustworthy Computing, 2006. IEEE International Conference. Jun. 5-7, 2006, Abstract Only pp. 1-2, downloaded from http://ieeexplore.ieee.org/xpl/abstractAuthors.jsp?tp=&arnumber=1636182&url=http%3A%2F%2Fieeexplore.ieee.org%2Fxpls%2Fabs_all.jsp%3Farnumber%3D1636182 Sep. 24, 2015.

* cited by examiner

| Device IDs | Device Keys | Owner ID |
| --- | --- | --- |
| Device_10 | B3NzaC1yc2EAax | John X. |
| Device_10a | H4JW9jbhUFrviQ | John X. |
| Device_10b | zuUFIjQJKprrX8 | John X. |
| ... | ... | ... |

OWNER BASED DEVICE AUTHENTICATION AND AUTHORIZATION FOR NETWORK ACCESS

BACKGROUND

Embodiments of the present invention relate in general to the field of granting network access to user devices. In particular, embodiments of the invention relate to methods for simplifying the process of granting network access to multiple devices of a same owner.

Usual authentication methods for granting network access to (wireless or wired) user devices are known to rely on: (i) a pre-shared key (or PSK) that is the same for all users and devices or (ii) user-specific credentials (e.g., cryptographic key, or user ID and password).

A disadvantage of using a PSK is that it cannot be revoked for individual users or devices. A user can even pass it on to other users, unbeknown to the network operator. Also, a PSK needs to be configured in each device that needs network access. Changing the PSK requires to update it in all devices. Nevertheless, a PSK is perhaps, today, the prevalent authentication method for residential networks.

On the other hand, using user-specific credentials is a common authentication method in enterprise networks. User-specific credentials require an authentication server for user management, a thing that is usually too burdensome for most private households. Each user who wants to access the network needs an account with credentials on the authentication server and the user needs to configure the credentials in each of her/his devices. Guests typically do not have accounts on the server, so that a new account must be created for each guest, who then needs to enter credentials in each of their devices.

SUMMARY

According to a first aspect, the present invention is embodied as a method for granting network access to any one of multiple devices of a same owner. This method assumes that each of the multiple devices has been previously associated with an owner at an authentication server, whereby device keys for authenticating said multiple devices are stored on the authentication server. In addition, this owner is assumed to have previously been authorized to access the network, such that an owner ID for this owner is stored on the authentication server. Basically, the method comprises, at the authentication server: receiving a network access request for a device to connect to a network, said device being one of the multiple devices; and, upon authenticating said device based on a device key associated with this device at the authentication server, confirming that network access can be granted for the device if said owner ID is confirmed to be associated with said device at the authentication server.

According to other, yet related aspects, the invention can be embodied as an authentication server or a corresponding computer program product.

According to another aspect, the invention can also be embodied as a method, as implemented from a network operator, the assumed context being otherwise identical. The network operator receives a network access request for a device to connect to a network, said device being one of the multiple devices, and transmit, to the authentication server, a network access request for this device to connect to the network, whereby, upon authenticating said device based on a device key associated with this device at the authentication server, the authentication server confirms that network access can be granted for the device if said owner ID is confirmed to be associated with said device at the authentication server. Next, the network operator may receive confirmation (from the authentication server) that network access can be granted for this device, whereby the operator can grant network access for the device.

Finally, according to other aspects, the invention can be embodied as a network operator's computerized device or a corresponding computer program product for enabling a network operator to grant network access to multiple devices.

Computerized units, program products and methods embodying the present invention will now be described, by way of non-limiting examples, and in reference to the accompanying drawings.

Figure 3:
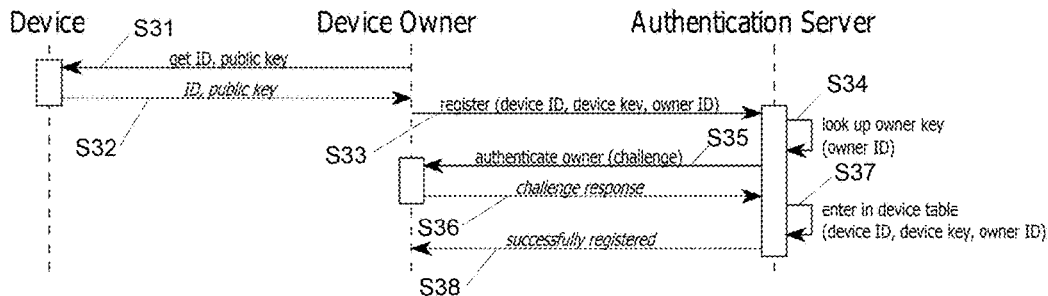
FIG. 3 is a flowchart illustrating steps of a method for associating a device with an owner at an authentication server, as involved in embodiments.
Figure 4:
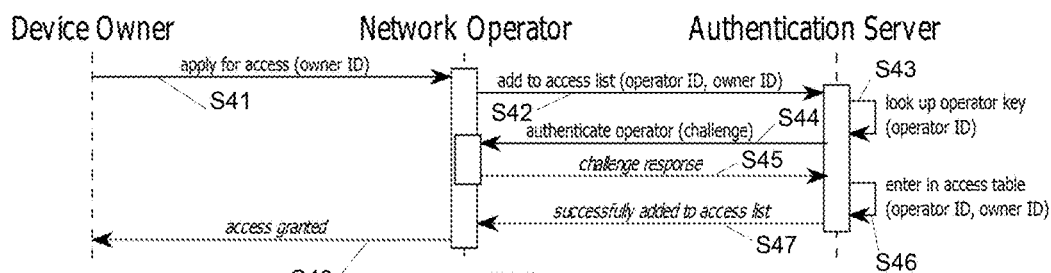
FIG. 4 is a flowchart illustrating steps of a method for authorizing a device owner to access a network, via an authentication server, as involved in embodiments.
Figure 5:
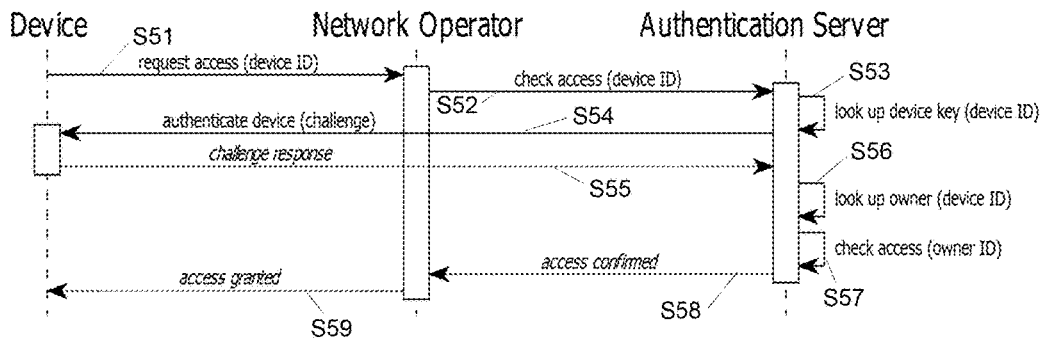
FIG. 5 is a flowchart illustrating steps of a method for granting a device network access, via an authentication server, according to embodiments.

In each of FIGS. 3-5, the functions performed by each of the components (device, owner, network operator and authentication server) are explicitly indicated in the flowcharts, together with the main parameters they use as input (the latter in parentheses).

DETAILED DESCRIPTION

Present inventors have realized that the procedures discussed in the background section may be cumbersome, inefficient and even insecure. In particular, configuring credentials in each device and for each network may become largely impractical as the number of devices per user is on the rise and expected to increase even more with the advent of the Internet of Things. Present inventors accordingly devised more practical solutions to such problems, which solutions are owner-based, rather than being device-based.

The following description is structured as follows. First, general embodiments and high-level variants are described (sect. 1). The next section (sect. 2) addresses more specific embodiments and technical implementation details.

1. General Embodiments and High-Level Variants

Some definitions are needed. First, a (device) owner is the owner of a device that wants to access the network via this device (notably). Second, a network operator is an operator of a network, which includes a router, or more generally, a computerized unit that can provide network access. In this application, it is assumed that a network operator includes at least a computerized unit (such as unit 101 in FIG. 2) that can communicate, on the one hand, with devices of an owner; and, on the other hand with an authentication server, so as to grant network access to such devices. More generally though, a network operator is typically a provider of services of, e.g., wireless communications that owns or controls elements necessary to sell and deliver services to an end user including, e.g., radio spectrum allocation, wireless network infrastructure, billing, customer care, provisioning computer systems, etc. Third, an authentication server can be any local or delocalized computer system, configured for performing authentication operations as described herein. In embodiments, the authentication server can be part of the network operator.

Figures 1, 6:
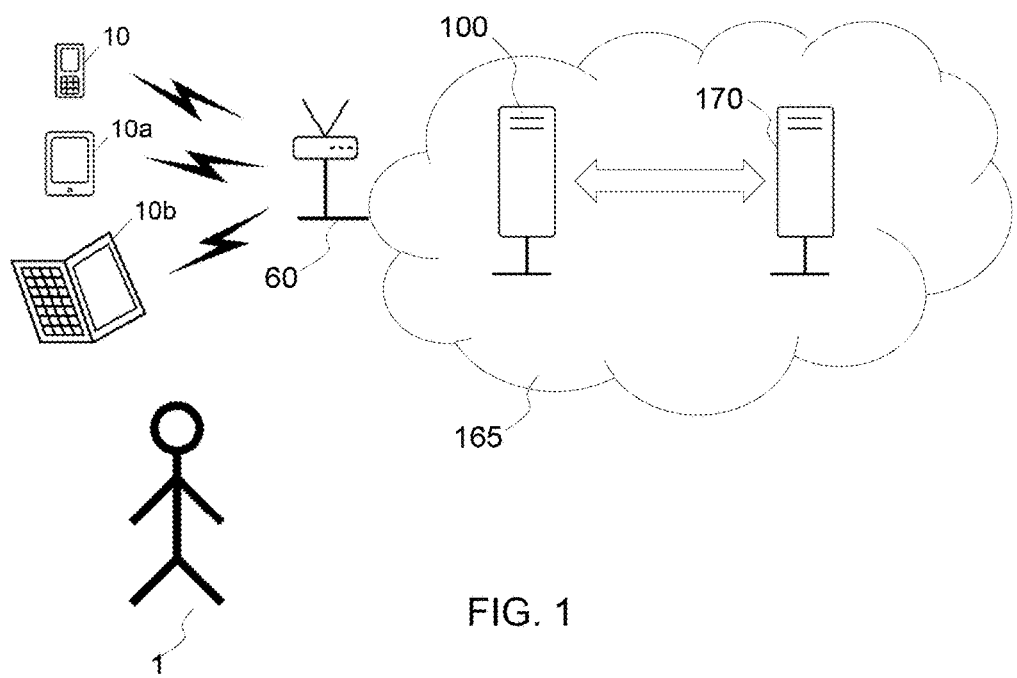
FIG. 1 schematically represents a user having multiple devices which, each, need network access, which access can be granted via a network operator's computerized unit and an authentication server, as in embodiments of the invention.
FIG. 6 schematically illustrates an owner-based access list, as used by an authentication server in embodiments.

In reference to FIGS. 1 and 5, an aspect of the invention is first described, which concerns a method for granting network access to any one of multiple devices 10, 10*a*, 10*b* of a same owner 1. In its most general embodiment, this method assumes that each of the multiple devices has been previously associated with an owner at an authentication server 170. As a result, device keys for authenticating said multiple devices are stored on the authentication server. In addition, it is assumed that said owner has previously been authorized to access the network, such that an owner ID for this owner is stored on the authentication server.

Having such assumptions in mind, the above method basically revolves around two steps, each implemented at the authentication server 170. First, a network access request is received (step S52 in FIG. 5) for a given device 10 to connect to a network 165. Said device can actually be any one of the multiple devices 10, 10*a*, 10*b* of the owner 1. Next, and upon authenticating S53-S55 said device based on a device key associated with this device at the authentication server, the authentication server 170 will confirm S58 that network access can be granted S59 for the device if said owner ID is confirmed S56-S57 to be associated with said device at the authentication server.

The above method requires to associate devices to their owner on the authentication server, which association results in storing device keys on the authentication server. Preferably, this key is a public key, the devices 10, 10*a*, 10*b* having otherwise access (or more preferably storing) a respective private key. The authentication server 170 is typically accessible by the network operator 100 (or any component of the latter), via a telecommunication network 165, e.g., in the cloud.

The request S52 is preferably sent from the network operator 100 itself, e.g., upon the latter receiving S51 a corresponding access request from the device 10. That is, when a device requests S51 access to the network to the network operator 100, the latter may relay that request to the authentication server 170, to check whether access can be granted.

As per the above method, the authentication server proceeds to authenticate the device using a respective device key, as already stored thereon. Network access is confirmed by the authentication server if, on the one hand, the device is successfully authenticated and, on the other hand, an owner of this device is confirmed to be associated to this device on the authentication server, i.e., meaning that the owner is authorized to access the network. In other words, the access is owner-based, instead of being device-based.

The final confirmation S58 to grant access is typically directly communicated to the network operator of the network for which access is requested by the device 10 in the first place. This communication S58 may, however, involve intermediaries (not shown).

The same applies to any device of the owner, for which network access is requested. In each case, confirmation as to whether network access can be granted is owner-based, instead of being device-based. In that respect, the above scheme preferably involves an owner-based access list, maintained at or for the authentication server 170. I.e., a network operator may maintain said list on a private router or server, or directly at the authentication server. This is discussed in detail below.

Thanks to the above method, multiple devices can be associated with their owner, so that granting network access depends on the owner without it being needed for the owner to configure owner credentials on each device or keys for each accessed network. This greatly simplifies user and device management, not only for owners (who typically also are the users of such devices), but also for network operators.

In addition, a network operator can now grant access to all devices of an owner at once, e.g., simply by adding the owner ID to a network access list (a list of owner IDs as maintained at the operator), or revoke access by removing the owner ID from the network access list, and, if necessary, by further interacting with the authentication server for the latter to update its own access list (referred to above as the "owner-based access list"). This is discussed below in more details, in reference to FIG. 4. Furthermore, a device owner can add or remove devices she/he owns by interacting with the authentication server, as discussed later in detail, in reference to FIG. 3.

As it can be realized, the above scheme may support multiple networks per operator and multiple owners per device.

Referring now more particularly to FIG. 5: in embodiments, the network access request received S52 is formulated so as to allow a device ID for the requesting device to be identified by the authentication server. Accordingly, the present method may further comprise, prior to authenticating S53-S55 said device, a step of retrieving S53 a device key for said device, based on a device ID identified from the network access request. The device key may be retrieved S53 using an access list that associates device keys to device IDs, respectively. The retrieved device key can be returned S53-S54 for subsequent authentication S54-S55 of the device key, as evoked earlier.

In embodiments, the same access list may further associate device IDs to owner IDs of the owners of the devices corresponding to such device IDs, to obtain a list (i.e., the "owner-based access list"). Accordingly, the confirmation step S58 can advantageously make use of this access list. I.e., step S58 may involve checking whether said owner ID is associated with said device ID, using the above access list, to confirm S58 whether said owner ID is associated with said device ID.

An illustrative example of such a list is depicted in FIG. 6, which list associates device IDs to corresponding device keys, as well as to respective owner IDs. In fact, it shall be apparent to the one skilled in the art that this list may be structured in many different logical ways. There is no strict need for an owner ID to be associated directly to each of the device keys and device IDs. E.g., the list may be substructured in two lists, one associating device IDs to device keys, another one associating device IDs or even device keys to an owner. The exact logic structure of the list is unimportant as long as it allows, on the one hand, device keys to be associated (be it directly or not) to device IDs and, on the other hand, an owner ID to be associated (directly or not) to the device IDs or keys of his/her devices.

In embodiments, step S57 (checking the owner ID) is only performed after having authenticated S53-S55 the requesting device. In principle, one may, however, first check whether an owner is associated to a device ID and then authenticate the device. It is nevertheless preferred to first authenticate the requesting device and then to check whether the owner is indeed associated to the corresponding device ID. Doing so makes it possibly to prevent to inadvertently expose the owner ID to a malicious device.

The steps S53, S56 and S57 are performed at the authentication server.

Preferably, the authentication server directly challenges (or at least instructs to challenge) S54 the requesting device based on the retrieved device key, to authenticate it. I.e., the authentication server preferably challenges the device directly, and may, to that aim, use a secure channel established with the requesting device, for security reasons. In variants, the authentication may involve a third party (e.g., like the network operator), in which case the authentication server merely instructs the third-party to challenge said device. The authentication completes, in all cases, based on an outcome of the challenge. I.e., a correct response to the challenge must be sent S55 by the requesting device to complete the authentication process S54-S58.

Next, the network operator may, upon receiving S58 confirmation to grant S59 network access by the authentication server, proceed to effectively grant S59 network access to the requesting device. At no time the above scheme makes it necessary for the owner to configure owner credentials or keys on or from said device.

The above methods and principles assume that the owner has previously been authorized to access the network. An exemplary scheme for authorizing a device owner for network access is now described in reference to FIG. 4. Basically, present methods may further comprise, prior to receiving S51, S52 a network access request, a process for authorizing S42-S47 the owner to access the network, whereby an owner ID is stored on the authentication server. Authorizing an owner to access the network means authorizing this owner to access the network via any one of his/her devices. Here again, the authorization is owner-based. The authorization is performed once and, preferably, by way of interactions with the network operator. It is simpler to perform it before registering a device for the first time at the authentication server or, subject to adapting the scheme of FIG. 3, together with it.

Steps S42-S47 notably comprise receiving S42 a request from the network operator for the owner to be authorized S48 to access the network. Then, the network operator is preferably authenticated S43-S45 based on a network operator key as stored on the authentication server. Upon successful authentication S45 of the network operator, the relevant owner ID can be associated S46 to the operator ID of the network operator. Such a scheme assumes that the operator already has an account at the authentication server, and, thus, has a key stored thereon. In variants, the owner may directly open an account at the authentication server, independently from the network operator. However, the network operator would subsequently need to be made aware of the owner ID as stored on the authentication server. Also, this variant is more complicated for the owner.

At present a possible scheme for associating a device with an owner is discussed in reference to FIG. 3. The steps depicted in FIG. 3 are performed prior to a network access request S51, S52 (FIG. 5) and after an owner has been authorized to access the network (FIG. 4). According to FIG. 3, each of the multiple devices can be associated S31-S38 with their owner at the authentication server, so as to associate a device ID for each of the multiple devices to the owner ID of the owner, at the authentication server.

In particular, steps S31-S38 be performed for one or more of the multiple devices, i.e., multiple devices may be registered at once. Upon receiving S33 a request (from the owner) for registering one or more of the devices, the owner may be authenticated S34-S36 based on a corresponding owner key (already stored on the authentication server at this stage). Then, upon successful authentication S36 of the owner, the owner ID may be associated S37 to the device ID of each the devices for which association is requested. This assumes that the authentication server already stores a key, e.g., a public key, for the owner, which is the case if an account had already been registered at the authentication server, as in FIG. 4.

According to other, yet related aspects, the invention can also be embodied as an authentication server 170 or, correspondingly, a computer program product, configured for confirming whether network access can be granted for any device of an owner, using an owner-based approach such as described above, particularly in reference to steps S52-S58. In particular, the authentication server may be configured to maintain an access list such as described above, i.e., associating, one the one hand, device keys to device IDs of devices, respectively, and, on the other hand, device IDs to owner IDs of owners of devices corresponding to such device IDs. The access list may be maintained directly at the authentication server, for security reason, or at the network operator, or still at a third party.

Referring back to FIG. 5, according to another aspect, the invention can also be embodied as a method implemented at a network operator. The assumed context remains unchanged. I.e., each of the owner devices has been previously associated with its owner, such that device keys for authenticating the devices are stored on the authentication server and the owner has previously been authorized to access the network, such that an owner ID is stored on the authentication server. From the viewpoint of the network operator 100, the following is performed: first a network access request is received S51 for a device 10 to connect to the network 165. Then, the network operator transmits, to the authentication server, a network access request for this device 10. Upon authentication S53-S55 of the device 10 (which uses a device key associated with this device at the authentication server), the authentication server shall confirm S58 that network access can be granted S59 if the owner ID is otherwise confirmed S56-S57 to be associated with said device. Next, the No receives such a confirmation S58 from the authentication server and proceeds to grant S59 network access for the device.

As further illustrated in FIG. 4, the network operator may interact S41-S48 as necessary with both the authentication server and an owner device to authorize its owner to access the network, so as for said owner ID to be stored S46 on the authentication server. In particular, the network operator may send S42 to the authentication server a request for said owner to be authorized S48 to access the network and, then, authenticate itself S43-S45 to the authentication server based on an operator key as stored thereon. Upon successful authentication S45, the network operator receives confirmation by the authentication server that said owner ID was associated S46 to its operator ID, such that the network operator can finally authorize S48 the owner to access the network.

Figure 2:
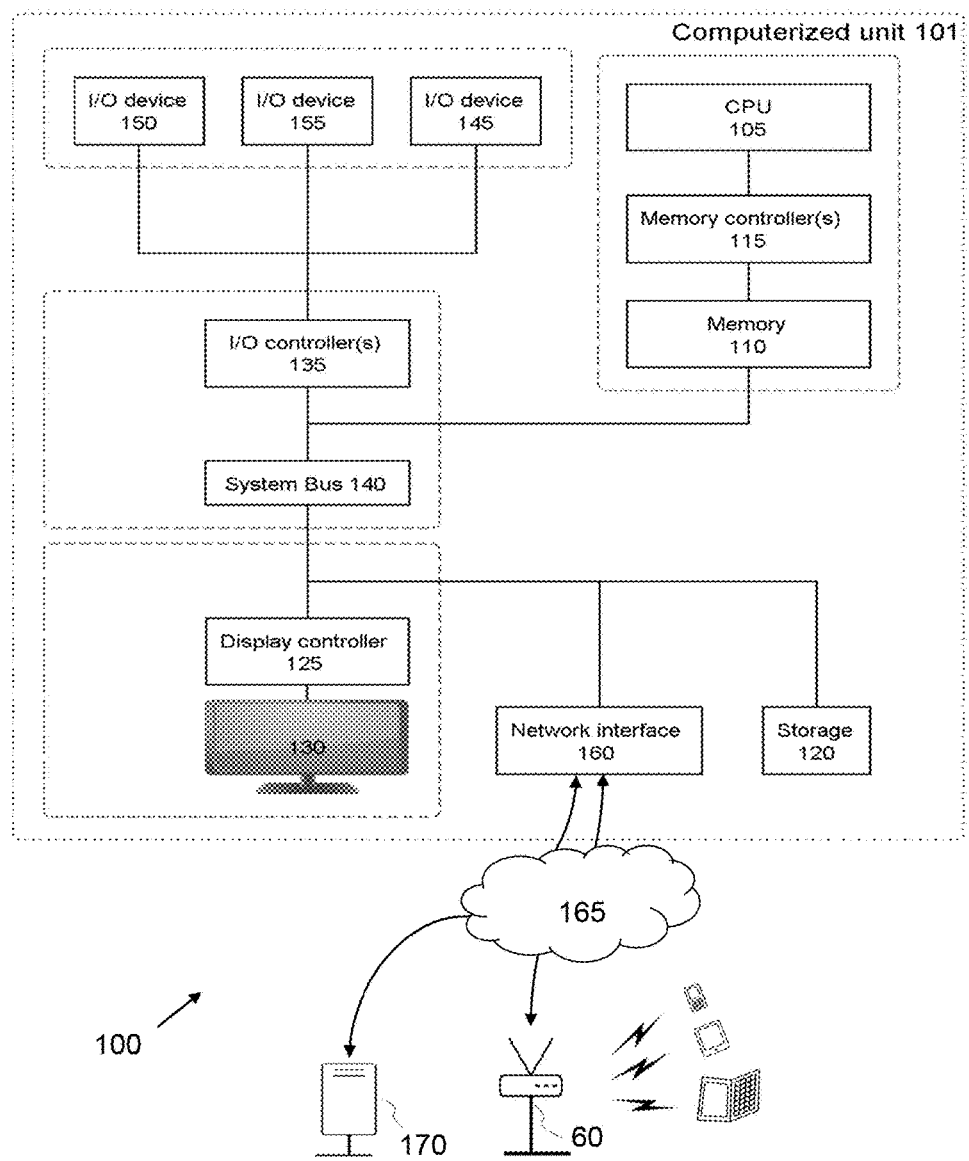
FIG. 2 schematically represents a general purpose computerized unit, which can for instance be used as a network operator's computerized unit (or even as an authentication server), for implementing one or more method steps according to embodiments.

The invention may consistently be embodied as a network operator, i.e., a computerized unit of a network operator, such as unit 101 depicted in FIG. 2. The unit 101 typically comprises one or more processing units 105 and a memory 110 storing computerized methods, which, upon execution by the processing units 105, may implement steps S51, S52 and S59 as described above. In embodiments, the network operator computerized unit is configured to maintain, locally or remotely, the owner-based access list described earlier, i.e., a list associating, one the one hand, device keys to device IDs of devices, respectively, and, on the other hand, device IDs to owner IDs of owners of devices corresponding to such device IDs. Similarly, the invention can be implemented by way of a computer program product, for implementing steps S51, S52, S58 and S59 as from the network operator point of view.

The above embodiments have been succinctly described in reference to the accompanying drawings and may accommodate a number of variants. Several combinations of the above features may be contemplated. Examples are given in the next section.

2. Specific Embodiments/Technical Implementation Details 2.1 Examples of Specific Embodiments For each device 10, 10a, 10b of a user/owner, a private key can be stored on the device, whereas the public key is stored on a central authentication server 170 on the public internet, in the cloud. The public key of each device may be associated with its owner, on the same server. Each network operator 100 may maintain a list of device owners on the router or any server controlled by the network operator. In addition, such a list may be maintained on the authentication server itself (as assumed in FIGS. 3-5).

FIG. 3 shows how to associate a device with its owner in the server records. In FIG. 4, a network operator adds a device owner to a network-access list. FIG. 5 illustrates the actual network access. For a device to connect to a network via a router 100 it connects via the router 100 to the authentication server 170 using, e.g., the EAP-TLS protocol and authenticates with it. When the server 170 has established S52-S58 the identity of the device, it looks up the owner, S56. To that aim, the server 170 may access the access list it maintains. In variants, the server 170 may send the owner ID to the router 100 who looks it up in its own access list. In all cases, the server 170 sends S58 an accept (or reject) notification to the router 100. According to the authorization result the router then grants S59 or denies the device network access.

Three secure channels can be established:
Device↔router (the initial network connection, e.g., Open System protocol);
Device↔server (for device authentication, e.g., EAP-TLS); and
Router↔server (to send owner ID, or to confirm the owner's access right).

The encryption keys for the final, authorized connection from the device via the router to the network may be sent from the server to both the router and the device (e.g., using EAP-TLS), or the device and the router may simply continue using their initial connection.

According to such as scheme, an operator can grant network access to all devices associated with an owner at once simply by adding the owner ID to its table of authorized users on the server (or the router). Access can be revoked by removing the user key. A user can add or remove devices from her list on the authentication server. The scheme can be further refined, e.g., by differentiating multiple networks per operator, or multiple users per device.

Moreover, there are numerous ways to generate and assign keys. For instance, a device may come with preconfigured keys (as assumed in the scenario of FIG. 3), the owner may generate and install keys, or the authentication server may generate them and pass them to the owner to install on the device. The server could also generate the keys for operators and owners. Alternatively, the keys could be provided by PKI.

If the device keys and their association to an owner are signed by the authentication server, the network operator could verify the device ID and its owner without invoking the authentication server. In this way, the authentication server would not need to know who accesses the network when. However, with this approach the operator would not automatically learn if a device has been disassociated from its owner.

An operator can also cache access decisions, which would come at the same cost regarding disassociated devices.

2.2 Examples of Use Cases

In an enterprise environment, an operator may typically be relieved of creating accounts for guests by using existing accounts on a cloud-based authentication server instead. Then, the operator would only have to add guest IDs to its access list. The operator may learn such IDs, e.g., from the server's directory, by e-mail from the guest or through any suited reservation system (e.g., in the case of a hotel).

Device owners do not need to enter any ID or password for each device anymore. The above scheme can also be used with a private server on the corporate network to allow employees to register their own devices.

A residential operator running a private wireless router may get access to a fully-featured, owner-based authentication system as described earlier with all the corresponding advantages (individual keys, revocability, easy change of keys, etc.) but without the need to run its own authentication server or manage user accounts. Adding a visitor to an access list, e.g., via a web interface is simpler than passing the PSK.

Moreover, if the router needs to be replaced it is not necessary anymore to change the access keys in all devices or configure a list of all devices in the new router. Instead, the new router only needs to be pointed to the operator's account on the authentication server to use the same access list as the replaced router.

The device owners manage their own accounts, in particular the device lists. By adding a new device to their list the device gets immediately access to all networks that the owner has access to. By removing a device, e.g., because it was sold or stolen, network access is immediately revoked.

The present methods are largely independent from the actual access technology, which may for instance use, e.g., wired Ethernet, BlueTooth, NFC, etc.

2.3 Computerized Devices

Computerized devices (in particular devices 100 and 170 shown in FIGS. 1 and 2) can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the computerized environment 100 depicted in FIG. 2 schematically represents a computerized unit 101, e.g., a general-purpose computer, which may be used as a router (or any computerized unit) of the network operator. Still, the same general architecture of unit 101 may also be used for the authentication server. In exemplary embodiments, in terms of hardware architecture, as shown in FIG. 2, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be connected to a system bus 140, and/or include one or more buses or other wired or wireless connections, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 2, the software in the memory 110 includes methods described herein in accordance with exemplary embodiments and a suitable operating system (OS) 111. The OS 111 essentially controls the execution of other computer programs, such as the methods as described herein (e.g., FIGS. 4-10), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 140-155 may include other hardware devices.

In addition, the I/O devices 140-155 may further include devices that communicate both inputs and outputs. The unit 101 can further include a display controller 125 coupled to a display 130. In exemplary embodiments, the unit 101 can further include a network interface or transceiver 160 for coupling to a network 165.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server (notably the authentication server 170), client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

2.4 Computer Program Products

The present invention may be embodied as a computerized unit, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of units, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The invention claimed is:

1. A computer-implemented method comprising:
   granting access to a network to any one of multiple devices of a same-owner,
   each of said multiple devices having been previously associated with said same-owner at an authentication server, with the result that a plurality of device keys for authenticating said multiple devices are stored on said authentication server; and said same-owner has previously been authorized to gain access to said network, such that a same-owner identification (ID) is stored on said authentication server;

listing of a device selected from any one of said multiple devices of said same-owner on said authentication server controlled by a network operator;

adding said same-owner ID to a same-owner-based access list of said same-owner associated with an operator ID of said network operator;

for each said device of said multiple devices, a private key is stored on said device, whereas a public key, associated with said same-owner, is stored on said authentication server on the public internet in the cloud;

associating each of said plurality of said device keys with a respective one of a plurality of device identification (IDs) or at least one of said multiple devices in said same-owner-based access list;

updating said same-owner-based access list to associate at least one of said plurality of device keys, or at least one of said plurality of device IDs with said same-owner ID;

receiving by said network operator, a network access request from and for said device to connect to said network, said device being one of said multiple devices of said same owner, wherein said network access request includes a device ID of said device requiring said network access request to be identified by said authentication server, but said network access request does not include said same owner ID;

receiving, by said authentication server from said network operator the network access request for said device;

authenticating, by said authentication server, said device using said device ID included in said network access request and a device key selected from said plurality of device keys, that is associated with said device ID on said same-owner-based access list and stored on said authentication server;

performing additional authentication in a challenge-response process between said authentication server and said device, based on the device key;

confirming, responsive to the additional authentication being successful, that at least one of said device ID and said device key is associated with said same-owner ID on said same-owner-based access list; and sending a notification causing said network operator to grant said device selected from any one of said multiple devices of said same-owner, access to said network, upon authenticating said device and confirming that at least one of said device ID and said device key is associated with said same-owner ID on said same-owner-based access list;

wherein said network access request is confirmed by said authentication server, if said device, selected from any one of said multiple devices of said same-owner, is successfully authenticated, or if said same-owner of said device is confirmed to be associated to said device on said authenticated server, such that, in either case, said same-owner is authorized to access said network with the result that the access is same-owner-based and not device-based.

2. The method of claim 1, wherein said network access request is received to allow said device ID for said device to be identified;

said method further comprising, prior to authenticating-said device:

retrieving said device key selected from said plurality of device keys for said device, based on said device ID identified from said network access request from said same-owner-based access list; and returning said retrieved device key for subsequent authentication of said device key.

3. The method of claim 1, further comprising, before adding said same-owner ID to said same-owner-based access list:

receiving a request from said network operator for said same-owner to be authorized to access said network;

authenticating said network operator based on an operator key stored on said authentication server; and upon successful authentication of said network operator, adding said same-owner ID to said same-owner-based access list.

4. The method of claim 2, wherein returning said retrieved device key for subsequent authentication comprises:

instructing to challenge said device based on said device key.

5. The method of claim 3 wherein:

updating said same-owner-based access list further comprises:

receiving a request from said same-owner for associating one or more of-said multiple devices with said same-owner ID;

authenticating said same-owner based on a corresponding owner key already stored on said authentication server; and upon successful authentication of said same-owner, associating said same owner ID to said device ID or said device key for each of said one or more of said multiple devices.

6. The method of claim 1, further comprising at said network operator in communication with said authentication server:

granting said network access to said device upon receiving said notification to grant said device access to-said network without it being necessary for said same-owner to have previously configured same-owner credentials or keys on or from said device for it to be granted access to said network.

7. The method of claim 1 wherein said device key stored on said authentication server is a public key.

8. A method comprising:

granting access to a network for any one of multiple devices of a same-owner, wherein:

each of said multiple devices has been previously associated with said same-owner at an authentication server, with the result that a plurality of device keys for authenticating said multiple devices are stored on said authentication server; and said same-owner has previously been authorized to access said network, such that a same-owner identification (ID) is stored on said authentication server;

for each device selected from said multiple devices of said same-owner, a private key is stored on said device, whereas a public key, associated with said same-owner, is stored on said authentication server on the public internet in the cloud and maintaining a record of each device owned by said same-owner on said authentication server controlled by a network operator;

adding said same-owner ID to a same-owner-based access list of said same-owner associated with an operator ID of said network operator;

updating said same-owner-based access list to associate new device IDs or device keys associated with said same-owner ID;

sending to said authentication server by said network operator, instructions to add said same-owner ID to said same-owner-based access list:

receiving by said network at said network operator, a network access request to connect a device to said network, said device being one of said multiple devices of said same-owner;

transmitting, to said authentication server, said network access request for said device to connect to said network, said network access request including a device ID of said device but not including said same-owner ID whereby, upon authenticating, by said authentication server, said device using a corresponding device key of said plurality of device keys performing additional authentication in a challenge-response process between said authentication server and said device, based on the corresponding device key; and upon confirming that at least one of the said device ID or said device key is associated with said same-owner ID on said same-owner-based access list stored on said authentication server, said authentication server sends a notification to cause said network operator to grant said device access to said network;

receiving, by the network operator from said authentication server said notification and granting said device access to said network;

wherein, network access is confirmed by said authentication server if said device is successfully authenticated or if said same-owner of said device is confirmed to be associated to said device on said authenticated server, such that, in either case, said same-owner is authorized to access said network with the result that the access is same-owner-based and not device-based.

9. The method of claim 8, further comprising:
prior to sending instructions to add said same-owner ID to said same-owner-based access list:
interacting with said device of said same-owner to authorize said same-owner to access said network;
each of said multiple devices having been previously associated with said same-owner at said authentication server, with the result that said device keys for authenticating said multiple devices are stored on said authentication server.

10. The method of claim 9, wherein sending instructions to add said same-owner ID to said same-owner-based access list comprises:
Sending, by the network operator to said authentication server, a request for said same-owner to be authorized to access said network:
authenticating said network operator based on an operator key stored on said authentication server; and
after successful authentication of said network operator by said authentication server,
receiving confirmation by said authentication server that said same-owner ID was added to said same-owner based access list.

11. An authentication server for granting network access to a network to any one of multiple devices of a same-owner, wherein said authentication server comprises:
one or more hardware processing units: and
a memory comprising computerized methods
said computerized methods configured, upon execution by said one or more hardware processing units, for:
adding a same-owner identification (ID) of said same-owner to a same-owner-based access list of said same-owner ID that is associated with an operator ID of a network operator of said network;
storing multiple device keys for authenticating said multiple devices:
associating each of said multiple device keys with a respective one of a plurality of said device IDs of said multiple devices in said same-owner-based access list;
updating said same-owner-based access list to associate at least one of said multiple device keys or at least one of said plurality of device IDs with said same-owner ID:
receiving a network access request for a device selected from one of said multiple devices of said same-owner to connect to said network, said network access request including a device ID of said device, but not including a same-owner ID;
authenticating said device in a challenge-and-response process using said device ID and a device key, selected from said multiple device keys associated with said device on said same-owner-based access list;
performing additional authentication in a challenge-response process between said authentication server and said device, based on the device key;
confirming that at least one of said device ID and said device key is associated with said same-owner ID on said same-owner-based access list and stored on said authentication server; and
sending a notification causing said network operator to grant said device access to said network, upon authenticating said device and confirming that said same-owner ID is associated with the at least one of said device ID and said device key on said same-owner-based access list.

12. A computer program product for granting access to a network to any one of multiple devices of a same-owner, comprising: a non-transitory computer readable storage medium having program instructions embodied therewith, said program instructions executable via one or more processing elements of said authentication server, to cause said authentication server to:
associate each of said multiple devices associated with said same-owner, with a corresponding one of a plurality of device keys for authenticating said any one of said multiple devices stored in memory on said authentication server;
for each said device selected from said multiple devices, storing a public key on said authentication server on the public internet in the cloud, the private key associated with the public key being stored on said device;
adding a same-owner identification (ID) of said same-owner to a same-owner-based-access list of said same-owner ID associated with an operator ID of a network operator of said network;
associating each of said plurality of said device keys with a respective one of a plurality of device IDs of said multiple devices in said same-owner-based access list;
updating said same-owner-based access list to associate at least one said plurality of device keys or at least one of said plurality of said device IDs with the said same-owner ID;
receiving network access request for a device selected from said multiple devices to connect to said network, said network access request including said device ID of said device but not including said same-owner ID;

authenticating said device using said device ID and a device key, selected from said plurality of device keys, that is associated with said device on said owner-based access list and stored on said authentication server;

performing additional authentication in a challenge-response process between said authentication server and said device, based on the device key;

confirming, responsive to the additional authentication being successful, that said same-owner ID is associated with at least one of said plurality of device IDs and said device key on said owner-based access list and stored on the authentication server; and sending a notification causing said network operator to grant said device access to said network, upon authenticating said device and confirming that said owner ID is associated with the at least one of said device ID and said device key on said owner-based access list;

wherein said network access is confirmed by said authentication server if said device is successfully authenticated or if said same-owner of said device is confirmed to be associated to said device on said authenticated server, such that, in either case, said same-owner is authorized to access said network with the result that the access is same-owner-based and not device-based.

* * * * *